(12) United States Patent
Shada et al.

(10) Patent No.: US 7,974,882 B1
(45) Date of Patent: Jul. 5, 2011

(54) METHOD AND SYSTEM FOR CREATING A COMPREHENSIVE UNDELIVERABLE-AS-ADDRESSED DATABASE FOR THE IMPROVEMENT OF THE ACCURACY OF MARKETING MAILING LISTS

(75) Inventors: Mark F. Shada, Omaha, NE (US); Matthew C. Newman, Omaha, NE (US)

(73) Assignee: Direct Resources Solutions, LLC, Omaha, NE (US)

( * ) Notice: Subject to any disclaimer, the term of this patent is extended or adjusted under 35 U.S.C. 154(b) by 1032 days.

(21) Appl. No.: 11/519,347

(22) Filed: Sep. 12, 2006

Related U.S. Application Data

(60) Provisional application No. 60/718,069, filed on Sep. 16, 2005.

(51) Int. Cl.
G07G 1/12 (2006.01)
G06F 7/00 (2006.01)

(52) U.S. Cl. .......................................... 705/24; 340/5.91

(58) Field of Classification Search ................... 705/401, 705/26, 24; 340/5.91
See application file for complete search history.

(56) References Cited

U.S. PATENT DOCUMENTS

| | | | | |
|---|---|---|---|---|
| 5,452,203 A * | 9/1995 | Moore | ........................... | 707/200 |
| 5,454,038 A * | 9/1995 | Cordery et al. | .................. | 705/60 |
| 5,925,864 A * | 7/1999 | Sansone et al. | ............... | 235/375 |
| 6,549,892 B1 * | 4/2003 | Sansone | ......................... | 705/401 |
| 6,557,000 B1 * | 4/2003 | Seestrom et al. | .............. | 707/100 |
| 6,826,548 B2 * | 11/2004 | Hungerpiller et al. | ......... | 705/401 |
| 6,865,561 B1 * | 3/2005 | Allport et al. | .................. | 705/406 |
| 6,954,731 B1 * | 10/2005 | Montague | ....................... | 705/10 |
| 6,978,248 B1 * | 12/2005 | Walker et al. | .................... | 705/10 |
| 7,277,898 B2 * | 10/2007 | Lego et al. | ............................. | 1/1 |
| 2001/0010334 A1 * | 8/2001 | Park et al. | ................. | 235/462.14 |
| 2001/0023408 A1 * | 9/2001 | Mc.Evoy et al. | ................. | 705/14 |
| 2002/0004745 A1 * | 1/2002 | Bascobert et al. | .............. | 705/14 |
| 2002/0029202 A1 * | 3/2002 | Lopez | ........................... | 705/406 |
| 2002/0042815 A1 * | 4/2002 | Salzfass et al. | ............... | 709/206 |
| 2002/0059142 A1 * | 5/2002 | Krause et al. | .................... | 705/44 |
| 2002/0120668 A1 * | 8/2002 | Pintsov et al. | ................ | 709/200 |
| 2002/0164012 A1 * | 11/2002 | Sadot | ........................... | 379/267 |
| 2002/0198942 A1 * | 12/2002 | Ryan | ............................. | 709/206 |
| 2003/0004787 A1 * | 1/2003 | Tripp et al. | ..................... | 705/10 |
| 2003/0114955 A1 * | 6/2003 | Daniels, Jr. | .................. | 700/224 |
| 2003/0182018 A1 * | 9/2003 | Snapp | ........................... | 700/225 |
| 2003/0191556 A1 * | 10/2003 | Stiebel et al. | ................. | 700/219 |
| 2003/0191651 A1 * | 10/2003 | Hungerpiller et al. | ............ | 705/1 |
| 2004/0093222 A1 * | 5/2004 | Sipe et al. | .......................... | 705/1 |
| 2004/0176973 A1 * | 9/2004 | Lapeze et al. | ..................... | 705/1 |
| 2004/0221011 A1 * | 11/2004 | Smith et al. | ................... | 709/206 |

(Continued)

*Primary Examiner* — Elaine Gort
*Assistant Examiner* — Ashford Hayles
(74) *Attorney, Agent, or Firm* — Suiter Swantz pc llo

(57) ABSTRACT

The present invention is directed to a method and system for generating a comprehensive undeliverable-as-addressed database and receiving mailing lists which may be analyzed to determine confirmed undeliverable-as-addressed records within a mailing list. Items of mail found to be undeliverable subsequent to mailing may be received at one or more processing locations, and consolidated into a single clearinghouse. The names and address of the intended recipient may be retrieved through scanning of the address via an optical character recognition software system or manually entered and may be stored in a consolidated database of confirmed undeliverable as addressed mail. Prior to mailing marketing materials, a mailing list may be compared with the consolidated database of confirmed undeliverable-as-addressed mail to determine confirmed undeliverable-as-addressed records. The undeliverable-as-addressed records may be flagged or alternatively removed from the mailing list.

16 Claims, 4 Drawing Sheets

U.S. PATENT DOCUMENTS

| | | |
|---|---|---|
| 2005/0004882 A1* | 1/2005 | Teichgraber et al. .......... 705/404 |
| 2005/0005164 A1* | 1/2005 | Syiek et al. .................... 713/201 |
| 2005/0049890 A1* | 3/2005 | Kan .................................. 705/1 |
| 2005/0075988 A1* | 4/2005 | Cordery et al. ................ 705/404 |
| 2005/0137991 A1* | 6/2005 | Bruce et al. .................... 705/410 |
| 2005/0149406 A1* | 7/2005 | Bascobert et al. ............... 705/14 |
| 2005/0188025 A1* | 8/2005 | Landau et al. ................. 709/206 |
| 2005/0234913 A1* | 10/2005 | Carone et al. ..................... 707/9 |
| 2006/0080266 A1* | 4/2006 | Kiani et al. .................... 705/402 |
| 2006/0155567 A1* | 7/2006 | Walker et al. ...................... 705/1 |
| 2006/0155714 A1* | 7/2006 | Lego et al. ..................... 707/100 |
| 2006/0184269 A1* | 8/2006 | Wilson et al. .................. 700/215 |
| 2006/0271236 A1* | 11/2006 | Rosen et al. ................... 700/221 |
| 2006/0276916 A1* | 12/2006 | Dearing et al. .................. 700/79 |
| 2007/0088749 A1* | 4/2007 | Lorch et al. ................. 707/104.1 |
| 2007/0135963 A1* | 6/2007 | Fogel et al. .................... 700/227 |
| 2007/0299792 A1* | 12/2007 | Pintsov et al. ................. 705/402 |
| 2008/0044057 A1* | 2/2008 | Keller et al. ................... 382/101 |

* cited by examiner

METHOD AND SYSTEM FOR CREATING A COMPREHENSIVE UNDELIVERABLE-AS-ADDRESSED DATABASE FOR THE IMPROVEMENT OF THE ACCURACY OF MARKETING MAILING LISTS

CROSS REFERENCE TO RELATED APPLICATIONS

The present application claims the benefit under 35 U.S.C. §119 of U.S. Provisional Application No. 60/718,069 filed on Sep. 16, 2005. Said U.S. Provisional Patent Application 60/718,069 is hereby incorporated by reference in its entirety.

FIELD OF THE INVENTION

The present invention relates generally to mass marketing systems and more particularly to a method and system for generating a comprehensive list of confirmed undeliverable-as-addressed records.

BACKGROUND OF THE INVENTION

Many businesses and corporations (hereinafter "distributors") rely upon the regular mailing of advertisements, brochures, catalogs and the like (hereinafter "marketing materials") to individuals and businesses for direct marketing of products and services. Conventionally, a distributor may create or purchase a mailing list. The mailing list may be employed to mail marketing material to each individual or business of a mailing list. Postage, printing and production costs for mailing marketing material to a large number of individuals or businesses of a mailing list are substantial.

A problem associated with mass mailing of marketing materials is that a large number of marketing materials do not reach their intended recipient. Many marketing materials may be returned to the sender due to an individual's change of address without notice. Additionally, addresses may include errors, which also cause mailed marketing material to be returned to the sender. This represents a significant wasted cost to the distributor since production, printing, and postage charges have been incurred without being received by the designated recipient.

Consequently, it would be beneficial to utilize a method and system for accessing a comprehensive database of undeliverable-as-addressed records to eliminate undeliverable-as-addressed records from a mailing list prior to incurring the expenses associated with production and postage of a specific mail project.

SUMMARY OF THE INVENTION

Accordingly, the present invention is directed to a method and system for generating a comprehensive national confirmed undeliverable-as-addressed database and receiving mailing lists which may be analyzed to determine confirmed undeliverable-as-addressed records within a mailing list. In an embodiment of the invention, items of mail found to be undeliverable subsequent to mailing may be received at one or more processing locations, and consolidated into a single clearinghouse. The names and address of the intended recipient may be retrieved through scanning of the address via an optical character recognition software system or manually entered and may be stored in a consolidated database of confirmed undeliverable-as-addressed mail. Prior to mailing marketing materials, a mailing list may be compared with the consolidated database of confirmed undeliverable-as-addressed mail to determine confirmed undeliverable-as-addressed addresses. Confirmed undeliverable-as-addressed records may include visual alerts or alternatively removed from the mailing list.

It is contemplated that the database may include names and addresses of undelivered mail from multiple contributors. As such, the database of undeliverable names and addresses from multiple contributors may be presented to a client allowing removal of any name or address which has been confirmed as an undeliverable address. Advantageously, an updated mailing list may be generated for each client wherein the mailing list has a low probability of undeliverable addresses.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawing.

Currently the United States Postal Service (USPS) offers the National Change of Address, Delivery Point Validation (DPV) and CASS certification services that assist in improving the accuracy of mailing lists and marketing databases. These services are effective but are not a complete solution for the associated cause of undeliverable-as-addressed mail. Marketing organizations experience undeliverable-as-addressed return mail ranging as high as 10%. Examples of these causes include individuals who move but do not report the move to the USPS, deceased individuals, data entry errors within consumer databases, rural areas that are required to use a post office box due to determinations made by the USPS but are not reported via public information. The method and system of the present invention may generate a single, comprehensive, national database of confirmed undeliverable-as-addressed records which may allow the reduction of cost and waste incurred when mailing mass communications to prospective customers and or current customers. As used herein, an undeliverable-as-addressed record may include a name and a mailing address. An undeliverable-as-addressed record may include an incorrect name and/or an incorrect mailing address.

Figure 1:
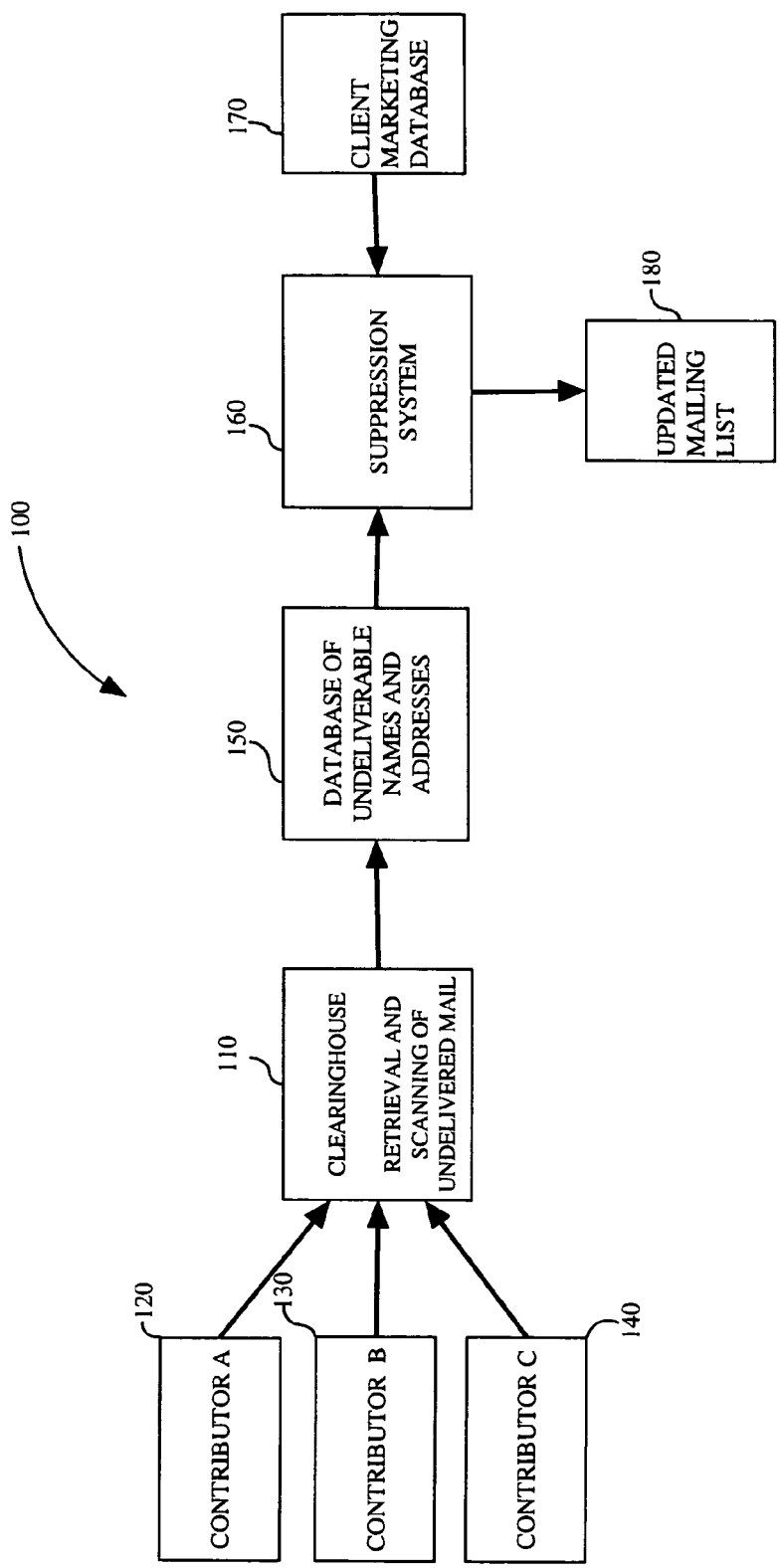
FIG. 1 depicts an exemplary diagram of a system for generating a mailing list in accordance with an embodiment of the present invention.

Referring to FIG. 1, an exemplary system 100 for generating a mailing list in accordance with an embodiment of the present invention is shown. The method and system of the present invention may include a clearinghouse 110, such as a single consolidation point for returned undeliverable-as-addressed mail from contributors 120-140. A contributor 120-140 may refer to any organization or business which may direct undeliverable-as-addressed mail to the clearinghouse 110. Post Office Boxes in several United States Postal Service (USPS) locations may be provided for contributors to utilize as their return address on mail pieces being sent using USPS first class postage.

It is further contemplated that contributions of undeliverable-as-addressed information may be received by an address change system. In an address change system, data concerning undeliverable-as-addressed records may be forwarded to the clearinghouse. One example of an address change system may be the USPS address change system (ACS). Mailers modify their mailing label format to include mailer identification. As ACS-modified mail pieces are processed via the USPS nationwide network of Computerized Forwarding System (CFS) sites, electronic change of address (COA) notifications are generated when possible. The ACS process involves the daily transmission of COA information from CFS sites to the NCSC, where the changes are consolidated into a file on a mailer-by-mailer basis. These records are organized by mailer identification codes and distributed to the participant mailer. Depending on a mail piece's class and endorsement, mailers may also receive information on addresses that are undeliverable for reasons other than a customer move (i.e., nixie notifications). It is contemplated that clearinghouse 110 may operate with ACS customers to receive the gathered information directly from the National Customer Support Center (NCSC) with the permission of ACS clients. It is further contemplated that data gathered from the NCSC may be delivered to the clearinghouse directly from the ACS Client. This would provide additional data regarding undeliverable-as-addressed mail which could be included within the database of undeliverable names and addresses.

Additional data regarding undeliverable-as-addressed information may be retrieved through standard class mail service endorsements. For example, ancillary service endorsements may be utilized by mailers to provide the USPS with instructions regarding the handling of undeliverable-as-addressed pieces. In an embodiment of the invention, pieces of undeliverable-as-addressed mail may be forwarded to the clearinghouse as an additional source of undeliverable-as-addressed records.

Figure 4:
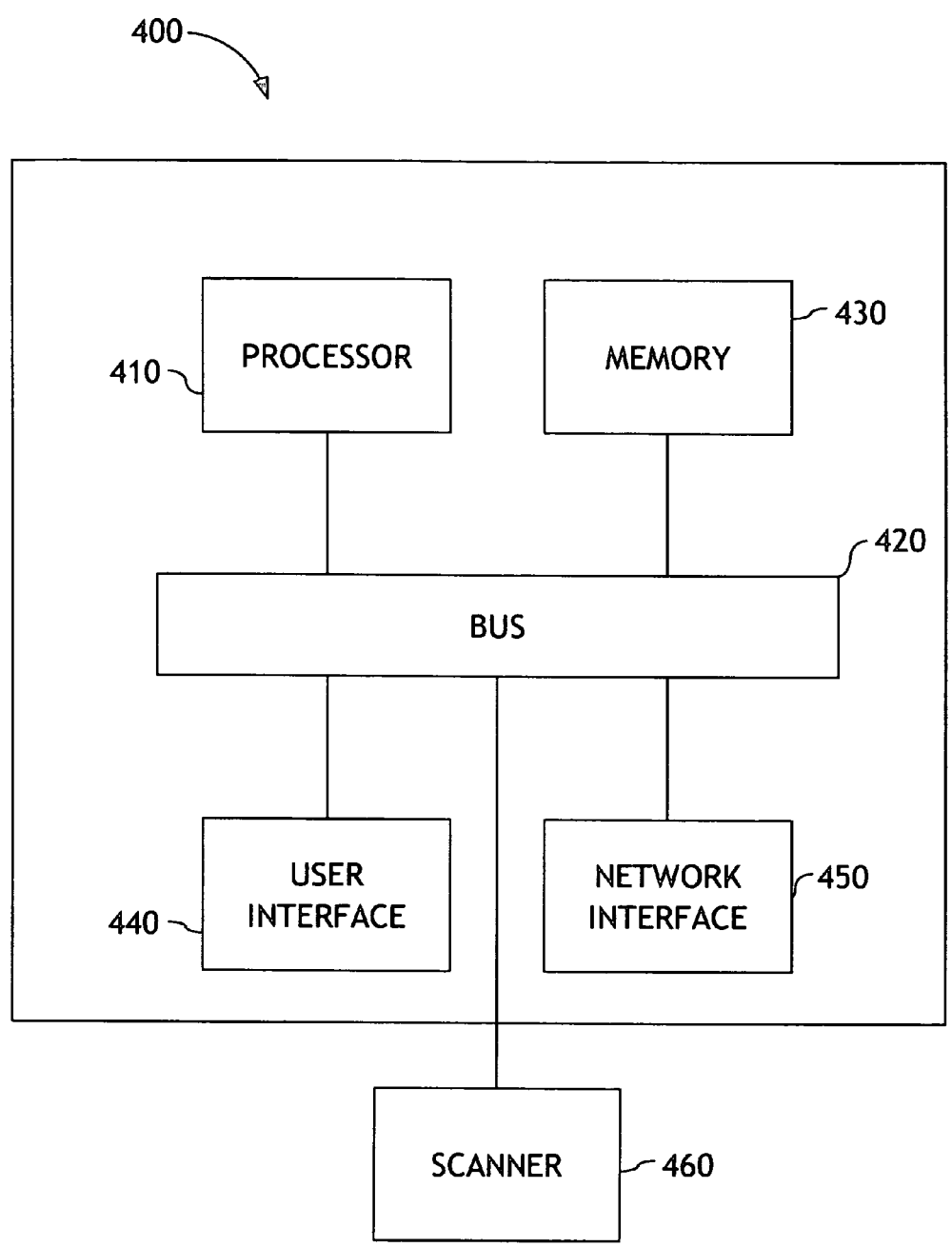
FIG. 4 depicts a block diagram of a computing system for generating a mailing list in accordance with an embodiment of the present invention.

Clearinghouse 110 may include a general purpose computer (as depicted in FIG. 4) and may utilize optical reader technology (OCR) to scan and collect the bad address information from actual mail pieces returned. Mail pieces returned by the USPS are scanned or manually data entered and the information is compiled in a confirmed undeliverable-as-addressed computer-based database 150. It is contemplated that the confirmed undeliverable-as-addressed computer-based database may refer to records which were addressed and mailed and returned by the USPS. It is contemplated that the clearinghouse 110 may include a rapid scanning system to allow mechanized transfer of mail pieces and scanning of addresses in a quick fashion. In some cases the undeliverable-as-addressed mail is unable to be read by the OCR, in those cases, the name and address information is manually collected and entered into the database 150. It is further contemplated that name and address information may be encoded into a multi-dimensional symbol, such as an image or bar-code, which may be scanned by the clearinghouse to obtain undeliverable-as-addressed records. Additional contributions of confirmed undeliverable as addressed records may be obtained by the clearinghouse 110 via contractual contributions of the undeliverable-as-addressed records currently being collected for use internally by many distributors or contracted third parties.

Multiple contributing distributors to the clearinghouse 110 include organizations such as, but not limited to, banking institutions, telecommunication companies, fundraising organizations, internet service providers, insurance, retail & catalog, pharmaceutical, health care, mortgage, auto manufacturers and state, local and federal government. Essentially any organization mailing marketing information using USPS first class postage is a potential contributor to the clearinghouse 110. Multiple mailing cycles, demographic targets and various databases from the major national compilers utilized by contributing organizations may create an accurate multiple source national database of confirmed bad records or undeliverable-as-addressed records.

For the benefit of clients sending First Class and Standard Class (Bulk Rate) marketing mail, the clearinghouse 110 offers its compiled list or database of confirmed undeliverable-as-addressed records via its suppression system 160. A "client" may refer to any organization or business that utilizes clearinghouse 110 for improvement of the accuracy of marketing mailing lists. Clients may deliver a mailing list, marketing database 170 and the like via media (CD/DVD, or Tape) or electronically transmit their marketing database or mailing list to the suppression system 160. A suppression system 160, software implemented computer-based system, in accordance with the present invention, may use name and address matching logic to compare names and addresses of a clients marketing database 170 with confirmed undeliverable-as-addressed names and addresses present within database 150. Suppression system 160 may locate and either flag (provide a visual alert) or eliminate known undeliverable-as-addressed records to produce an updated mailing list 180. In such a fashion, any record within mailing list which has been confirmed as undeliverable mail may be flagged. For example, a client who sends 100 million marketing pieces per year at a cost of $0.50 per individual marketing piece and as a result of the clearinghouse suppression service is able to achieve a 5% reduction in undeliverable-as-addressed mail will realize the following benefits: $2.5 million reduction in mailing costs and a savings of 600,000 pounds of paper waste per year. Suppression system 160 may operate to automatically remove undeliverable-as-addressed addresses from client delivered mailing addresses. In an alternative embodiment, suppression system 160 may indicate confirmed undeliverable-as-addressed addresses to the client to allow the client to determine if they should be included within the updated mailing list 180. It is further contemplated that undeliverable-as-addressed addresses found within mailing lists of clients may be flagged by the suppression system 160 of the present invention.

Figure 2:
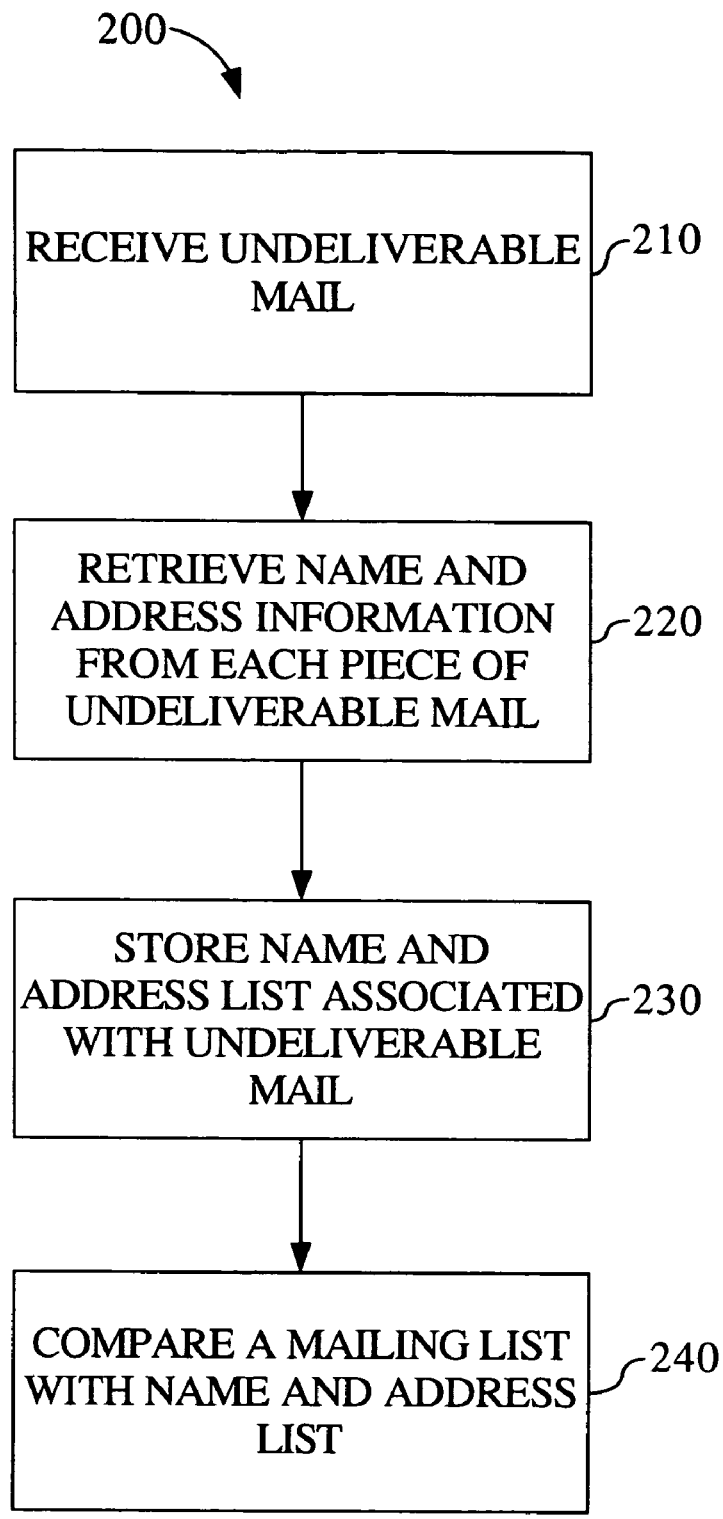
FIG. 2 depicts a method for detecting confirmed undeliverable-as-addressed records within a mailing list in accordance with an embodiment of the present invention.

Referring to FIG. 2, a method 200 for detecting confirmed undeliverable-as-addressed records within a mailing list in accordance with an embodiment of the present invention is shown. Method 200 for detecting confirmed undeliverable-as-addressed records in accordance with the present invention may begin upon the receipt of undeliverable-as-addressed information 210. Information may include data from an ACS client. Information may also include pieces of undeliverable-as-addressed mail. Each name and address from each piece of undeliverable-as-addressed mail may be retrieved 220. The retrieved names and addresses may be stored within a list 230, such as a comprehensive list of known undeliverable-as-addressed records. The comprehensive list may be stored as a database to enhance searching and editing capability. A new mailing list, containing records of potential customers, may be compared with the list of known undeliverable-as-addressed records 240. This may allow notification or removable of confirmed undeliverable-as-addressed records within the mailing list.

Figure 3:
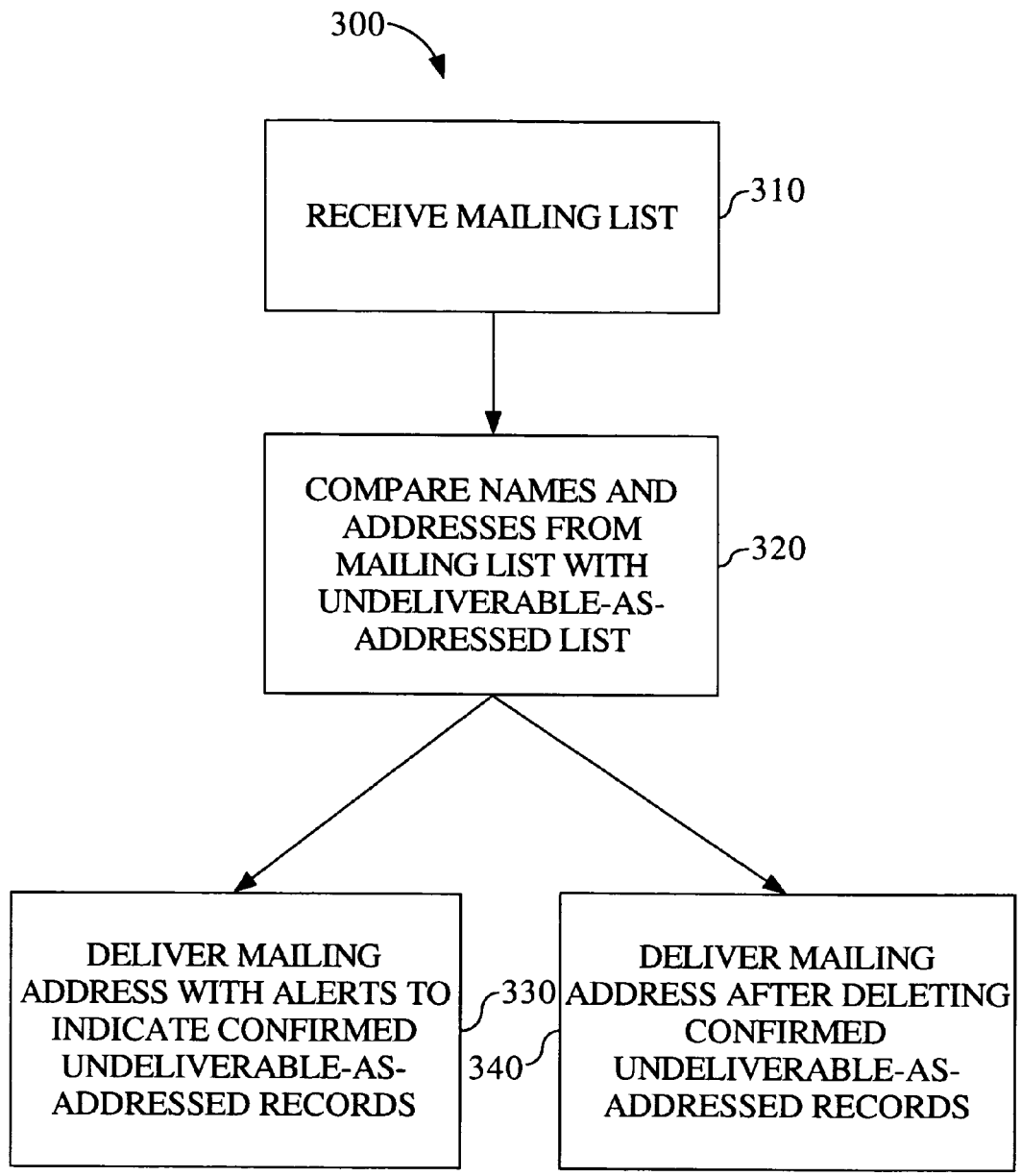
FIG. 3 depicts a method for revising a mailing list in accordance with an embodiment of the present invention.

Referring to FIG. 3, a method 300 for revising a mailing list in accordance with an embodiment of the present invention is shown. Method 300 for revising a mailing list in accordance with the present invention may begin upon the receipt of a mailing list 310. Names and addresses of the mailing list may be compared with an undeliverable-as-addressed list of records. The comparison may detect confirmed undeliverable-as-addressed records within the mailing list. Method 300 may deliver a revised mailing list with alerts to indicate confirmed undeliverable-as-addressed records within the revised mailing list 330. Alerts may refer to visual icons, colors, strike-throughs and the like which may visually indicate confirmed undeliverable-as-addressed records from the other records. Alternatively, method 300 may deliver a revised mailing list with confirmed undeliverable-as-addressed records being deleted from the revised mailing list 340.

Referring to FIG. 4, a block diagram of a computing system 400 for generating a mailing list in accordance with an embodiment of the present invention is shown. Database 150 and suppression system 160 of FIG. 1 may be implemented through computing system 400. Computing system 400 may include a processor 410, a bus 420, a memory 430, user interface 440, and a network interface element 450. It is contemplated that computing system 400 may be implemented as a personal computer, server, and the like without departing from the scope and intent of the present invention.

Processor 410 may include one or more central processing units such as microprocessors or microcontrollers for executing programs stored in memory 430. Communication with the processor 410 may be implemented through a message or system bus 420 for transferring information. Memory 430 may include random access memory (RAM) and may also include read only memory (ROM). Memory 430 may store the database of undeliverable-as-addressed records compiled from pieces of undelivered-as-addressed mail and ACS data. User interface 440 may include input elements such as a keyboard, mouse and the like whereby an administrator may enter commands that may be executed by processor 410. User interface 440 may be employed to manually enter names and addresses into a database of undelivered as addressed mail. Network interface 450 may provide transfer of data, video and the like between the computing system 400 and remote servers, workstations, storage and the like including network attached storage. Computing system 400 may operate with a scanner 460. Scanner 460 may be employed with the computing system 400 for scanning of address information. Computing system 400 may include optical reader technology (OCR) to collect name and address information from scanned documents.

Removal of undeliverable-as-addressed records from mailing lists prior to production and postage provides a number of advantages. Client production, postage and associated paper costs may be reduced. It is contemplated that the present invention may protect consumers from fraud by eliminating the possibility of credit offers based on personal information being sent to an incorrect address. By employing a single source for receipt data and mail pieces of actual returned mail, a single database and national source of confirmed undeliverable-as addressed records may be created. Additionally, it is contemplated that significant environmental benefits may be realized due to reduction of raw material usage and paper waste.

It is contemplated that the clearinghouse 110 and suppression system 160 of FIG. 1 may be offered to clients according to various mechanisms. Suppression services may be sold on a per match basis by which clients are charged by the number of undeliverable as addressed records the suppression system 160 identifies within a client marketing/mailing list. In some cases, clients may require an annual license agreement. Under an annual license agreement, the entire undeliverable as addressed database and continuous media updates may be sent to a client via media or electronic transfer for use internally. Annual license agreements have inherent added security features since the marketing list does not leave the client's site.

It is contemplated that the list of undeliverable-as-addressed records may be assembled and stored in a list in an electronic fashion. In one embodiment of the invention, the records may be stored within a database. A database may refer to a collection of information organized in a fashion for entering, accessing and retrieving specific pieces of data, for example a single undeliverable-as-addressed record. While a list of undeliverable-as-addressed records may be incorporated into a database, it is contemplated that the list of undeliverable-as-addressed records may be maintained in a variety of other electronic formats without departing from the scope and intent of the present invention.

It is believed that the system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof.

What is claimed is:

1. A computer implemented method for generating a revised mailing list, comprising:
   registering a first contributor by a computing device, said first contributor directs undeliverable-as-addressed postal mail to a clearinghouse;
   registering a second contributor by a computing device, said second contributor directs undeliverable-as-addressed postal mail to said clearinghouse;
   receiving undeliverable-as-addressed postal mail sent by said first contributor and said second contributor, said receiving undeliverable-as-addressed postal mail includes providing a post office box for receipt of undeliverable-as-addressed postal mail, said undeliverable-as-addressed mail includes individual pieces of returned postal mail for said first contributor and said second contributor;
   retrieving name and address information from the undeliverable-as-addressed postal mail by a computing device;
   storing name and address information by a computing device retrieved from the undeliverable-as-addressed postal mail to a list of undeliverable-as-addressed records; and
   comparing a mailing list with stored address and name information by a computing device, wherein name and address records of said mailing list are compared with stored name and address information from the list of undeliverable-as-addressed records to detect confirmed undeliverable-as-addressed records within said mailing list, wherein said confirmed undeliverable-as-addressed records within said mailing list are at least one of identified or deleted from said mailing list.

2. The method as claimed in claim 1, wherein said name and address information is retrieved from individual pieces of returned postal mail by scanning said individual pieces of returned postal mail.

3. The method as claimed in claim 1, wherein said name and address information is stored within a database.

4. The method as claimed in claim 1, further comprising providing a visual alert for confirmed undeliverable-as-addressed records within said mailing list.

5. The method as claimed in claim 1, further comprising deleting confirmed undeliverable-as-addressed records from said mailing list.

6. A system for generating a revised mailing list, comprising:
   means for registering a first contributor, said first contributor directs undeliverable-as-addressed postal mail to a clearinghouse;
   means for registering a second contributor, said second contributor directs undeliverable-as-addressed postal mail to said clearinghouse;
   means for receiving undeliverable-as-addressed postal mail sent by said first contributor and said second contributor, said means for receiving undeliverable-as-addressed postal mail includes a post office box for receipt of individual pieces of returned postal mail for said first contributor and said second contributor;
   means for retrieving name and address information from the undeliverable-as-addressed postal mail;
   means for storing name and address information retrieved from the undeliverable-as-addressed postal mail to a list of undeliverable-as-addressed records; and
   means for comparing a mailing list with stored address and name information, wherein name and address records of said mailing list are compared with stored name and address information from the list of undeliverable-as-addressed records to detect confirmed undeliverable-as-addressed records within said mailing list, wherein said confirmed undeliverable-as-addressed records within said mailing list are at least one of identified or deleted from said mailing list.

7. The system as claimed in claim 6, wherein said name and address information is retrieved from individual pieces of returned postal mail by means for scanning said individual pieces of returned postal mail.

8. The system as claimed in claim 6, further comprising means for providing a visual alert for confirmed undeliverable-as-addressed records within said mailing list.

9. The system as claimed in claim 6, further comprising means for deleting confirmed undeliverable-as-addressed records from said mailing list.

10. The method as claimed in claim 1, wherein said undeliverable-as-addressed record includes at least one of an incorrect name or incorrect address.

11. The method as claimed in claim 1, wherein said first contributor and said second contributor include at least one of an organization and a business.

12. The system as claimed in claim 6, wherein said first contributor and said second contributor include at least one of an organization and a business.

13. A computer readable medium having stored thereon a set of instructions which when executed by a computing device perform a method of generating a revised mailing list comprising:
   registering a first contributor;
   registering a second contributor;
   receiving undeliverable-as-addressed mail information acquired from postal mailings sent by said first contributor and said second contributor, said undeliverable-as-addressed information including data from individual pieces of returned postal mail for said first contributor and said second contributor;
   retrieving name and address information from the undeliverable-as-addressed mail information;
   storing name and address information by a computing device retrieved from the undeliverable-as-addressed mail information to a list of undeliverable-as-addressed records; and
   comparing a mailing list with stored address and name information by a computing device, wherein name and address records of said mailing list are compared with stored name and address information from the list of undeliverable-as-addressed records to detect confirmed undeliverable-as-addressed records within said mailing list, wherein said confirmed undeliverable-as-addressed records within said mailing list are at least one of identified or deleted from said mailing list.

14. The medium as claimed in claim 13, wherein said name and address information is stored within a database.

15. The medium as claimed in claim 13, further comprising providing a visual alert for confirmed undeliverable-as-addressed records within said mailing list.

16. The medium as claimed in claim 13, further comprising deleting confirmed undeliverable-as-addressed records from said mailing list.

* * * * *